United States Patent [19]

Hart et al.

[11] Patent Number: 5,553,217
[45] Date of Patent: Sep. 3, 1996

[54] DOCUMENT LAYOUT USING TILING

[75] Inventors: Peter E. Hart, Menlo Park; Jeffrey K. Chilton, Mountain View; Mark Peairs, Menlo Park, all of Calif.

[73] Assignees: Ricoh Company, Ltd., Tokyo, Japan; Ricoh Corporation, Menlo Park, Calif.

[21] Appl. No.: 125,958

[22] Filed: Sep. 23, 1993

[51] Int. Cl.⁶ .................................................... G06F 17/21
[52] U.S. Cl. .......................................... 395/148; 395/145
[58] Field of Search ................................... 395/142–148, 395/133; 382/8, 9

[56] References Cited

U.S. PATENT DOCUMENTS

| | | | |
|---|---|---|---|
| 4,595,958 | 6/1986 | Anderson, Jr. et al. | 358/480 |
| 4,608,664 | 8/1986 | Bartlett et al. | 364/900 |
| 4,866,784 | 9/1989 | Barski | 382/46 |
| 4,941,189 | 7/1990 | Britt | 382/46 |
| 5,120,940 | 6/1992 | Willsie | 235/462 |
| 5,179,650 | 1/1993 | Fukui et al. | 395/148 |
| 5,181,162 | 1/1993 | Smith et al. . | |
| 5,185,813 | 2/1993 | Tsujimoto | 382/9 |
| 5,218,460 | 2/1993 | Nakajima | 358/456 |
| 5,287,443 | 2/1994 | Mameda et al. | 395/146 |
| 5,379,373 | 1/1995 | Hayashi et al. | 395/148 |
| 5,381,523 | 1/1995 | Hayashi | 395/145 |

FOREIGN PATENT DOCUMENTS 2246102  1/1992  United Kingdom .

OTHER PUBLICATIONS

Wahl, Frederick M., Wong, Kwan Y., and Casey, Richard G. "Block Segementation and Text Extraction in Mixed Text/Image Documents", Computer Graphics and Image Processing 20 (1982), pp. 375–390.

*Primary Examiner*—Almis R. Jankus
*Assistant Examiner*—Rudolph J. Buchel
*Attorney, Agent, or Firm*—Townsend and Townsend and Crew; Philip H. Albert

[57] ABSTRACT

A method and apparatus for formatting a document and creating a best document layout from an input list of picture and text objects is disclosed. The method includes calculating multiple document layouts while maintaining the correct reading order of the picture and text objects at all times. The method positions each picture and text object at multiple anchor points to create multiple document layouts, and then selects a best document layout which is the layout using the least number of pages to display the entire list of objects. If more than one layout uses the least number of pages, the layout positioning the least number of objects on the last page is the best layout.

25 Claims, 8 Drawing Sheets

DOCUMENT LAYOUT USING TILING

The present invention relates generally to a method of formatting a document. More specifically, the present invention relates to a method of creating a new document layout for a document already having an old document layout by using a programmed computer.

BACKGROUND OF THE INVENTION

For some time now, the publishing industry has used computer systems to arrange text and pictures into formatted documents. The publishing industry commonly refers to the process these computer systems use to perform document formatting tasks as a "paste-up" process. The paste-up process consists of arranging text and pictures to fit on a page and conform to a specific page layout format.

These paste-up systems commonly act on text in either an ASCII-, DTP-, or word processor-specific format. This requires that a user either input the text to the paste-up system by an input device such as a keyboard or send a file of the text and pictures to the paste-up system. Thus, if a document containing text is scanned and digitized into data, before it can be in any useful format for a paste-up system, the document must be converted to ASCII, DTP, or word processor format.

To convert the scanned and digitized data to character data, a character recognition program is used. Various character recognition methods are well known in the art and include template matching and shape analysis programs. However, all known character recognition programs require extensive processing time and require large amounts of memory.

Common paste-up systems also require user-interaction to decide on the placement of certain areas of text or picture. During the run-time of a paste-up system, the system will typically, prompt a user to receive input as to the proper placement of an area of text or a picture. This has the obvious disadvantage of requiring an operator for the paste-up system and slowing down the system while input from the user is awaited for.

SUMMARY OF THE INVENTION

The present invention solves the problems of the prior art by providing a system for creating a formatted document from input data representing an electronic image of the document rather than ASCII or word processor codes of the actual text. The present invention also provides a system that does not require user interaction or correction, although such guidance may be an option.

One aspect of the present invention provides for a method of formatting a document using a programmed computer. The present invention formats a document by receiving an ordered list of objects to be displayed in the formatted document, creating a plurality of document layouts by successively positioning each object according to its order in the list, at various places in the document according to a rule of placement, and selecting a best document layout from the plurality of document layouts so that the document comprises a least number of pages. After the best document layout is selected, the present invention can output the best layout to a printing device, a display device, a file, or use any other output device to output the best layout as desired.

Another aspect of the present invention provides a method of creating a formatted document by scanning and digitizing a document image; creating a list of primitive objects from the digitized image; building a list of object areas from the list of primitive objects, ordering the object areas according to a reading order, creating a plurality of document layouts from the ordered object areas, selecting a best document layout, and creating the formatted document from the best document layout.

An additional aspect of the present invention allows a user to edit the list of object areas to create any desired reading order or to remove specific object areas from the ordered list.

A still further aspect of the present invention allows for document layouts to be examined at an intermediate stage of completion. If, at the intermediate stage, the document layout is already inferior to other layouts, the inferior layout can be discarded before it is completed.

DETAILED DESCRIPTION OF ONE EMBODIMENT

Figure 1:
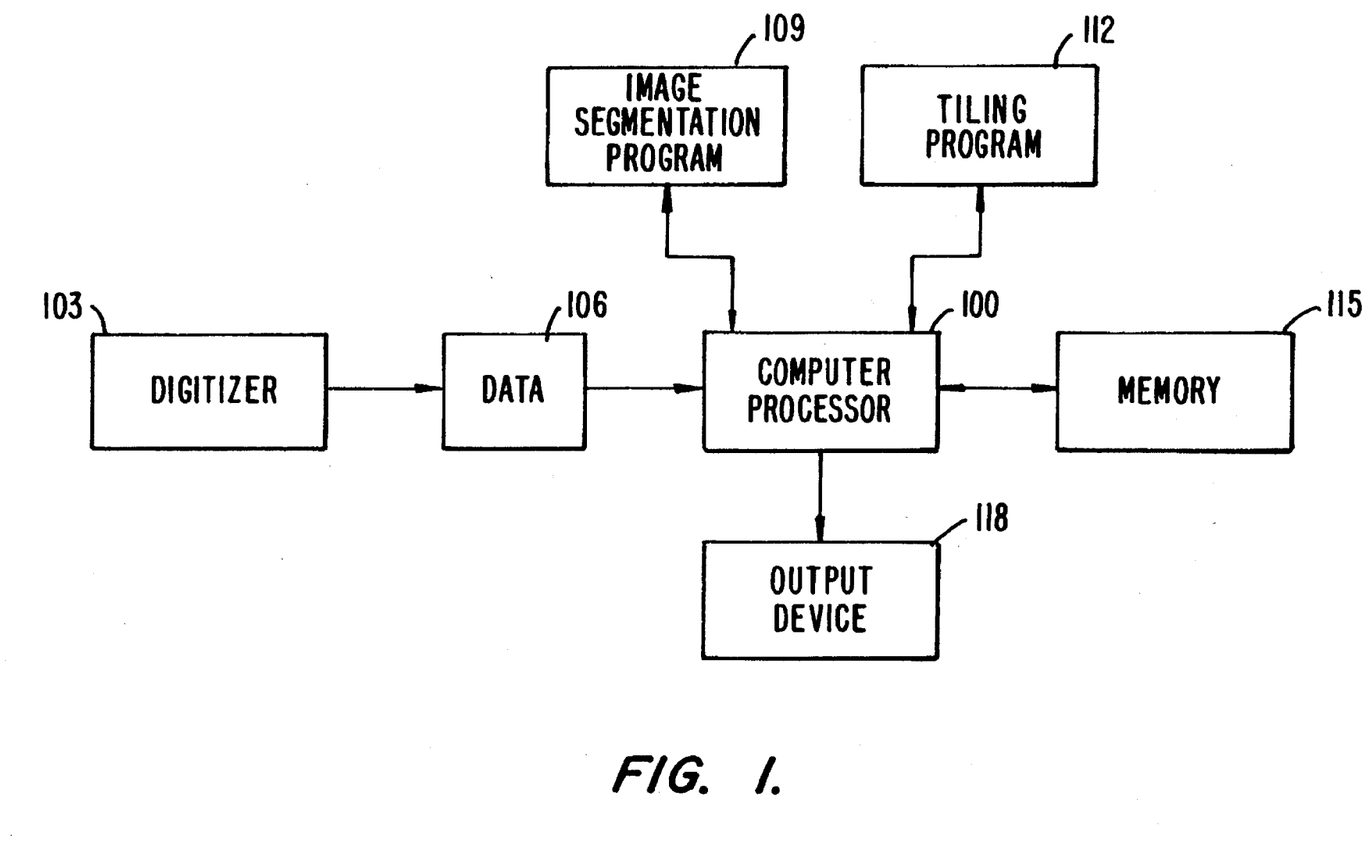
FIG. 1 is a block diagram of a system for practicing the preferred embodiment of the present invention.

FIG. 1 is a block diagram of a system for practicing the preferred embodiment of the present invention. The system comprises a digital computer processor 100, a digitizer 103, data 106, an image segmentation program 109, a tiling program 112, a memory 115, and an output 118.

Digital computer processor 100, using the method and apparatus described below, operates upon data 106 derived from an input document. A DEC Station 3100 from Digital Equipment Corporation, Maynard, Mass. has been successfully used as computer processor 100 in this embodiment. However, a copying machine, fax machine, scanner, or other multi-function device with appropriate processing chips and logic elements may be used as digital computer processor 100 in other embodiments.

Data 106 is derived from the input document by a digitizer 103. Digitizer 103 scans the input document and converts its contents into a series of computer understandable digital representations. The digital representations, called data 106, represent the scanned document image and are delivered to computer 100. Computer 100 then passes data 106 through image segmentation program 109, which separates text segments from other elements or objects of the scanned document image; creates a list of these objects, known as primitive objects; and finally creates a list of object areas containing homogeneous primitive objects. The operation of image segmentation program 109 and the details of primitive objects and object areas are discussed in more detail below with respect to FIG. 2.

After receiving a list of the object areas from image segmentation program 109, computer 100 enlists tiling program 112 to create a new document layout for the document image scanned and digitized by digitizer 103. Tiling program 112 performs this operation by calculating multiple document layouts from the data in the list of object areas. After every possible document layout is determined, tiling program 112 then selects the best layout as an output. The details and specifics about the operation of tiling program 112 will be discussed in detail below with respect to FIGS. 3 through 11.

Computer 100 uses memory 115, which can be a read-only memory, a random access memory, a hard disk drive, or other memory device or combination of memory devices, to store all or part of image segmentation program 109 and tiling program 112. Memory 115 also stores digitized data 106 and other data used by computer 100.

Once the best layout is selected by tiling program 112, computer 100 uses output device 118 to output the new document image. Output device 118 can either be of the electronic type (i.e., video monitor or modem) or of the printed type (i.e., a laser printer or plotter).

Figure 2:
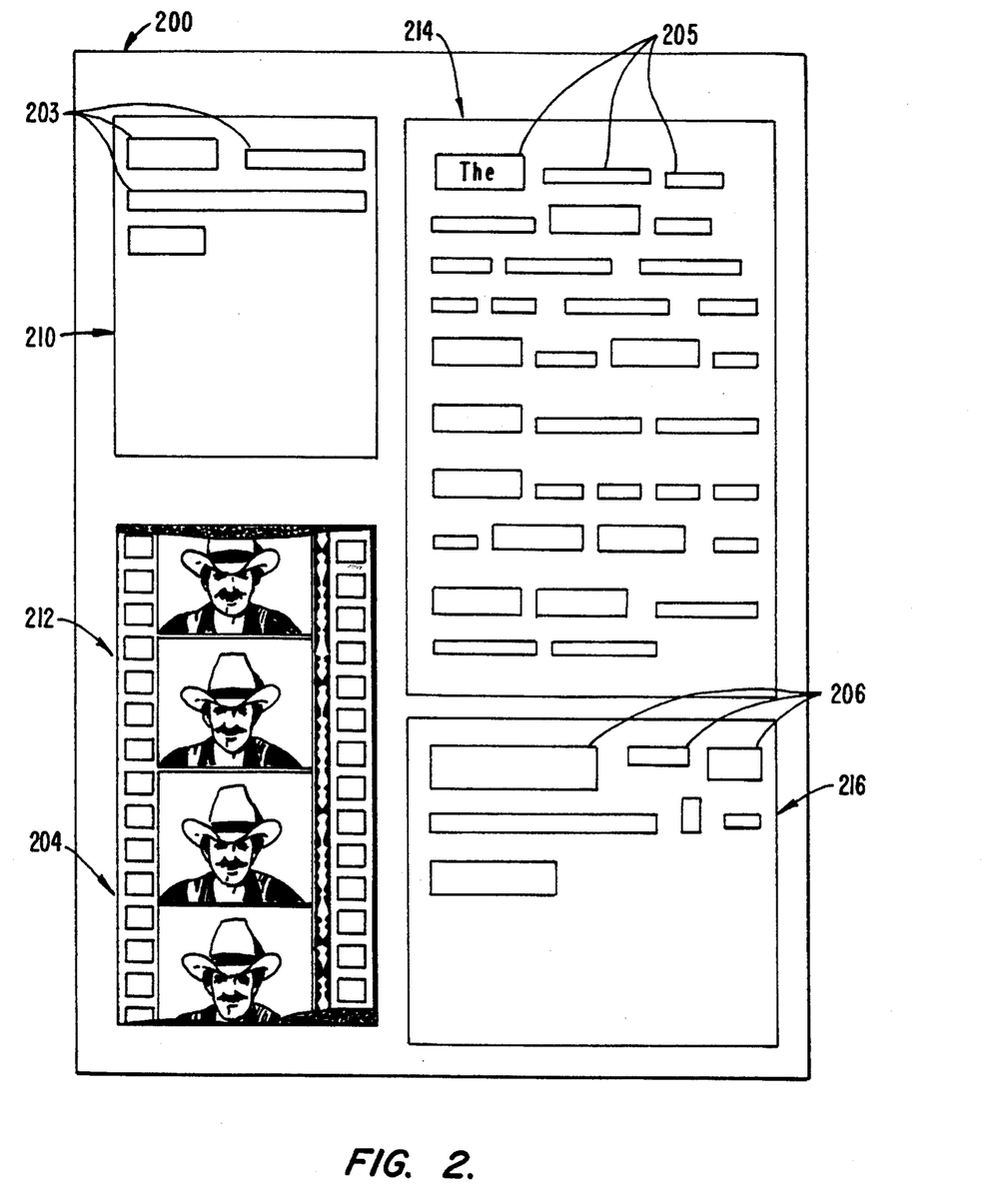
FIG. 2 is an illustration of primitive objects, text areas, and picture areas used in the system of FIG. 1.

FIG. 2 is an illustration of the primitive objects and their relationship to object areas as used in the system of FIG. 1. FIG. 2 depicts a page of an input document 200 that is scanned and digitized by digitizer 103 and turned into data 106. Input document page 200 is broken up by image segmentation program 109 into text primitive objects 203, 205, and 206 and picture primitive object 204. From primitive objects 203–206, image segmentation program 109 creates object areas 210, 212, 214, and 216, which are lists of homogeneous primitive objects. After creating object areas 210, 212, 214, and 216, image segmentation program 109 orders them into an ordered list and assigns each object area a reading order number which relates to the position in the input document at which the object area is naturally read. Details on the operation of image segmentation program 109 are discussed in the following paragraphs.

The operation and construction of image segmentation programs are well known to those skilled in the art. There are many different programs and methods that identify and separate text portions from image or picture portions of a document image. Generally, image segmentation programs can be categorized as using manual, semiautomatic, or fully automatic methods. The use of any type of image segmentation program can be successfully implemented in the system of FIG. 1, but because of their ease of use, fully automatic methods are preferable.

Fully automatic image segmentation systems can be further categorized as using a top-down approach, a bottom-up approach, or a combination of the top-down and bottom-up approaches referred to as a hybrid approach. Various methods of implementing these approaches can be found in the following documents: Baird, et al., *Image Segmentation by Shape-Directed Conversions*, Proceedings of the 10th International Conference on Pattern Recognition, Atlantic City, N.J., June 1990; K. Y. Wong, R. G. Casey, and F. M. Wahl, *Document Analysis System*, IBM Journal of Research and Development, Vol. 26, No. 6, pp. 647–656; J. R. Gattiker and R. Katsuri, *Improved Algorithm for Text String Separation for Mixed Text/Graphics Images*, Computer Engineering Technical Report, TR-88-043, Department of Electrical Engineering, Pennsylvania State University; T. Pavlidis, *Page Segmentation by the Line Adjacency Graph and the Analysis of Run Lengths*, Feb. 1990; T. Pavlidis, *A Vectorizer and Feature Extractor for Document Recognition*, Computer Vision, Graphics and Image Processing, Vol. 35, pp. 111–127 (1986); and U.S. Patent application of John Cullen and Koichi Ejiri, "Segmentation of Text, Picture and Lines of a Document Image" Ser. No. 07/864,423 filed on Apr. 6, 1992, now U.S. Pat. No. 5,335,290.

The system of FIG. 1 uses the method disclosed in the U.S. patent application for "Segmentation of Text, Picture, and Lines of a Document Image" by John Cullen and Koichi Ejiri for image segmentation program 109, but the use of the image segmentation process according to any of the above documents is sufficient.

To create an ordered list of object areas, image segmentation program 109 initially extracts a list of primitive objects 203–206 from data 106 in a manner that is well known. Primitive objects 203–206 are rectilinear polygons usually containing a text word or a group of text words as in primitive objects 203, 205, and 206 or a picture image as in primitive object 204. Because primitive objects are rectangular in shape, they can be stored by saving a beginning and ending X coordinate, a beginning and ending Y coordinate, the image data of the text or picture image that fills the rectangular area of the primitive object, and a type indicator to indicate whether the image data represents text words or a picture area.

Primitive objects 203–206 and 206 are then grouped into object areas 210, 212, 214, and 216, respectively. Each object area is a collection of homogeneous primitive objects. Typically, but not always, object areas represent paragraphs or columns of text or a picture block. Like primitive objects, each object area is also a rectilinear polygon that is described primarily by its coordinates. Thus, similar to primitive objects, object areas comprise a beginning and ending X coordinate, a beginning and ending Y coordinate, and a type indicator. Additionally, object areas comprise an integer that represents a reading order (described below) of the object area, an indicator that represents whether the object area is mapped to a page, an integer that represents the page the object area is mapped to, and a list of pointers that represent the primitive objects that are contained in the object area.

The system embodied in FIG. 1 is primarily concerned with object areas containing text or picture objects, but the processing of other object area classes is possible in further embodiments of the present invention.

Text object areas such as object areas 210, 214, and 216 contain lists of text primitive objects 203, 205, and 206, while picture object areas such as object area 212 contain a single picture primitive object 204. Image segmentation program 109 groups object areas 210, 212, 214, and 216 into a list of object areas by assigning each object area a reading order number that is ordered sequentially in a manner that corresponds with the reading order of each object area in the original document layout. The reading order is assumed to be in a top to bottom, left to right manner for the English language. This list of ordered object areas is then returned by image segmentation program 109 to computer 100 for further processing by tiling program 112.

Figure 3:
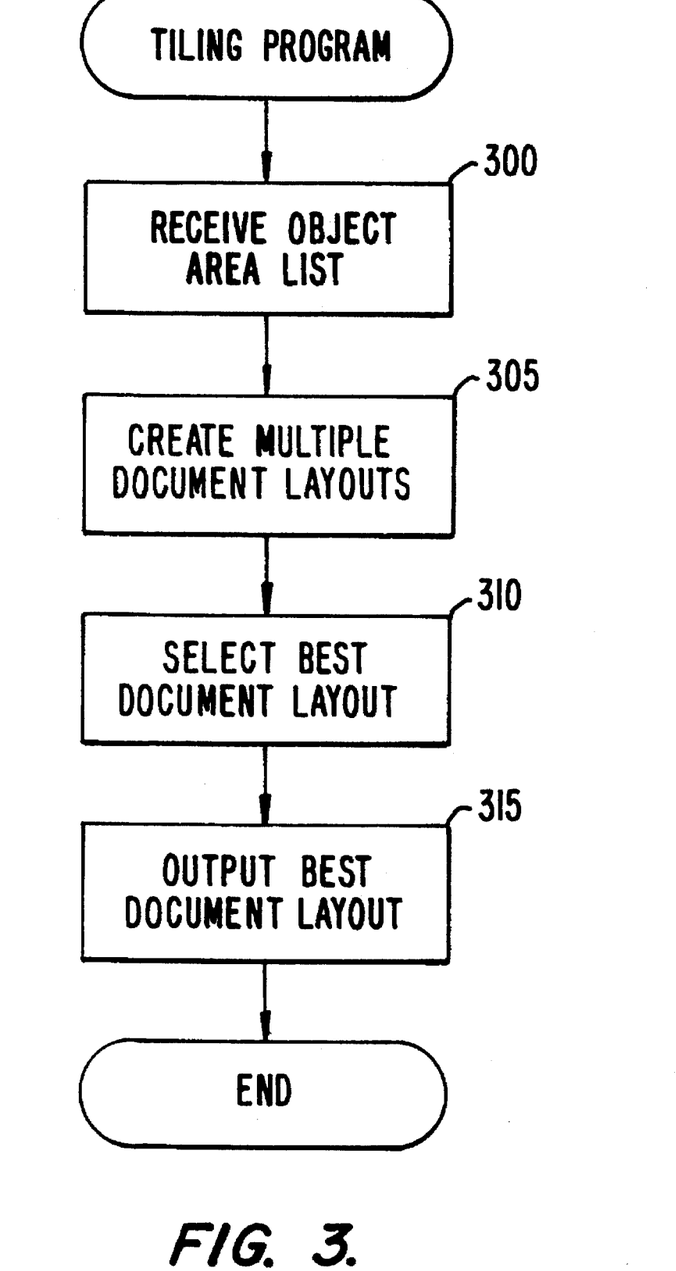
FIG. 3 is a flowchart of the process by which the system of FIG. 1 determines a best document layout.

FIG. 3 is a flowchart of the process by which the system of FIG. 1 determines a best document layout. In step 300, tiling program 112 receives an ordered list of object areas from computer 100. During step 305, multiple document layouts are recursively created by positioning the various object areas from the received list of object areas at multiple positions or anchor points.

An anchor point is an X,Y coordinate on a document layout page at which the top left corner of an object area is placed. Since the object area is known to be a rectangular area and is described by its height and width, the exact area used or taken up by an object area positioned at an anchor point is easily determined. Thus, by calculating and saving an anchor point for each object area of a document, the layout of an entire document can be determined. A list of anchor points that represent positions of respective object areas is referred to as a mapped area list. When a mapped area list is completed (each area in the list of object areas is mapped at an anchor point), the created layout of a document can be saved by storing the completed list of anchor points—such a list is then referred to as a layout list. The data structure used to represent a layout list includes pointers that point to successive mapped object areas in the layout list, an integer that represents the number of pages in the document layout of the particular layout list, and an integer that represents the number of object areas placed on the last page of the document layout of the particular layout list.

Multiple document layouts can be created by positioning object areas at different anchor points to construct different layout lists. Step 305 creates differing layouts by recursively constructing multiple layout lists. The specifics of step 305 will be discussed in detail in relation to FIGS. 4 and 5.

After all the possible document layouts have been calculated by step 305, step 310 determines the best layout. The best layout is defined as the layout that requires the least number of pages. If more than one layout comprises the least number of pages, then from these layouts, the layout having the least number of object areas on the last page is selected. Step 315 then outputs the best layout from tiling program 112 to computer 103 so that the best layout can be transmitted to output device 118.

It should be noted that there are many different rules that can be used in step 310 to determine which layout created by tiling program 112 is the best layout. Other embodiments of the present invention may reflect these various rules.

Figure 4:
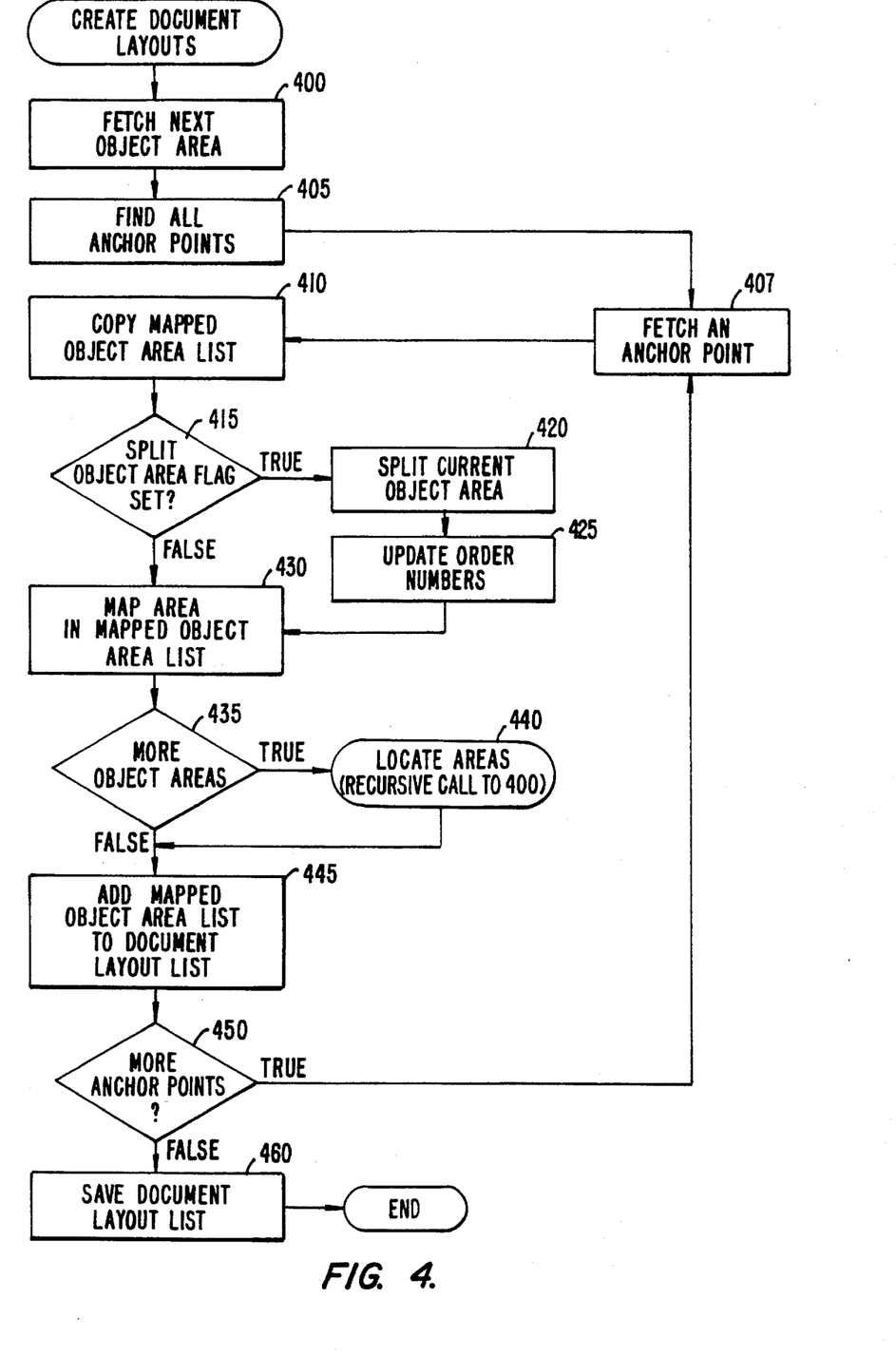
FIG. 4 is a flowchart showing how the system of FIG. 1 creates multiple document layouts by locating and relocating object areas at different positions in a document layout.

FIG. 4 is a flowchart showing how multiple document layouts are created in step 305 by locating and relocating object areas at different positions in a document layout. The procedure used in FIG. 4 is a recursive procedure that will locate a first object area, then locate each subsequent object area until all object areas are placed in the document layout.

In step 400, an object area is retrieved from the list of object areas. All the possible anchor points for the retrieved object area are calculated in step 405 and if an anchor point will cause the retrieved area to span a page boundary, a split area flag is set (see description below and FIG. 5 for more details on the calculation of anchor points).

Step 407 retrieves an anchor point for the current object area. Then, step 410 makes a working copy of the current list of mapped object areas. When the current object area is the first area being mapped, the list of mapped object areas is empty; otherwise, the list contains the list of anchor points at which each previously mapped object area was positioned. Step 415 checks if the split area flag was set during step 405. If it was, in step 420 the current area is split into two new areas. The first new area is sized to just fit within the page boundary, and the second new area is added to the front of the list of object areas. The steps of splitting an object area are discussed in more detail below in relation to the discussion of FIG. 6b. Step 425 then updates the reading order numbers in the object area list by promoting the reading order number of each object area subsequent to the newly inserted object area.

At step 430, the object area is mapped into the object area list. Step 435 then checks on whether there are more object areas that still need to be mapped. If there are more object areas to be mapped, the create document layout procedure calls itself recursively in step 440.

The recursive nature of the create multiple document layouts procedure creates multiple layout lists, with each layout list representing a different document layout. If there are no more areas, step 445 adds the completed area list (the layout list) to a list of completed layouts, referred to as the list of document layouts, which is used to save each completed document layout. The list of document layouts is implemented using pointers to each layout list.

Step 450 then checks if there are more anchor points for the last object area mapped. If there are more anchor points, step the system returns to step 407 and retrieves the next anchor point. Otherwise, if there are no more anchor points, the current document layout list is saved in step 460, and the end of the create multiple document layouts procedure is reached.

Figure 5:
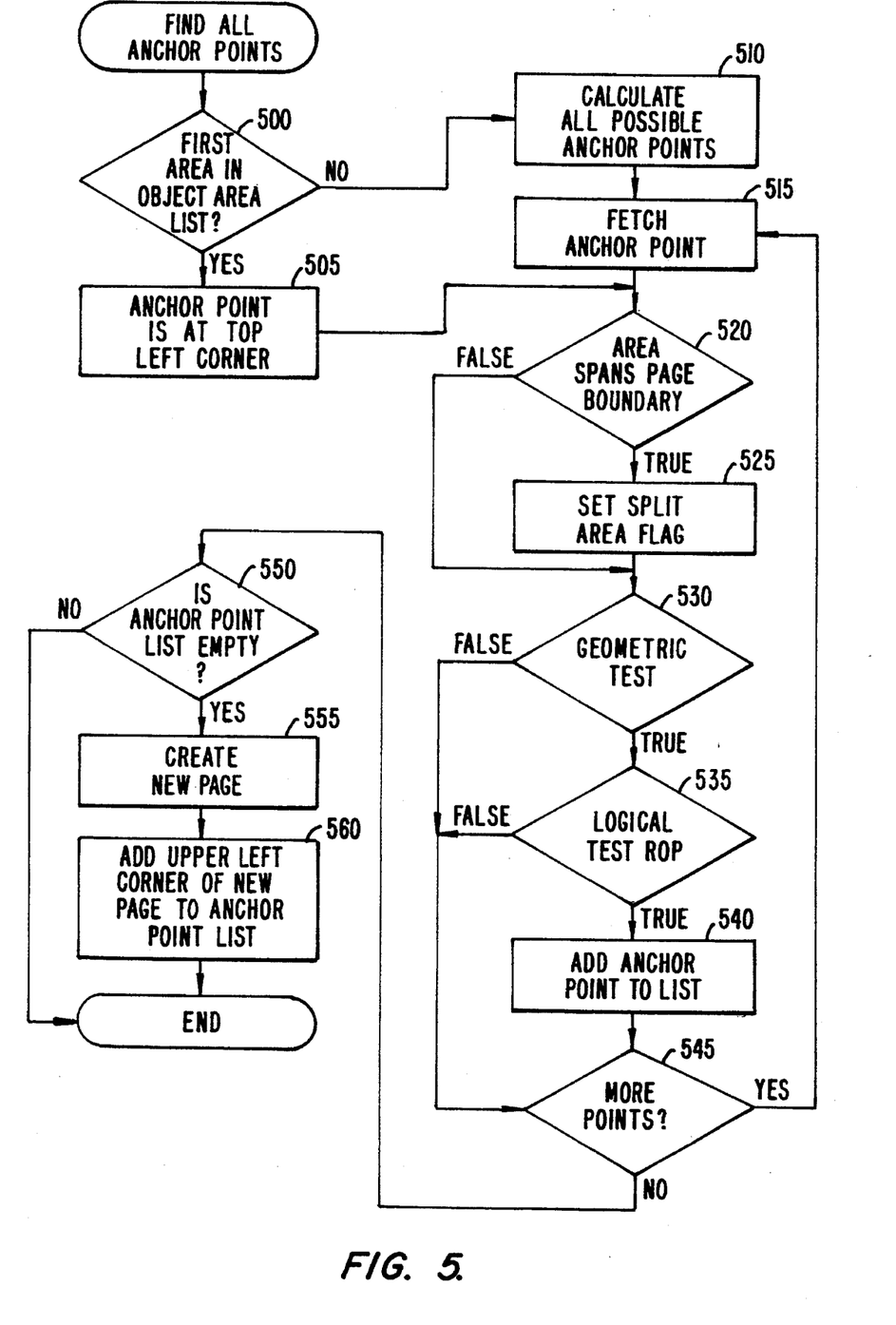
FIG. 5 is a flowchart showing how the system of FIG. 1 selects anchor points for each object area using a rule of placement.

FIG. 5 is a flowchart showing how anchor points are selected by step 405 for each object area using a rule of placement. Step 500 checks whether the current object area is the first object area in the list of object areas. If it is the first, there is only one possible anchor point at which the current object area may be positioned—the upper left corner of the first page. In step 505 the possible anchor point list reflecting only one possible placement for the current object area is created.

If the current object area is not the first object area from the list of object areas, all possible anchor points for that object area are calculated in step 510. Potential anchor points are calculated by using previously placed object areas as points of reference.

Figure 6A:
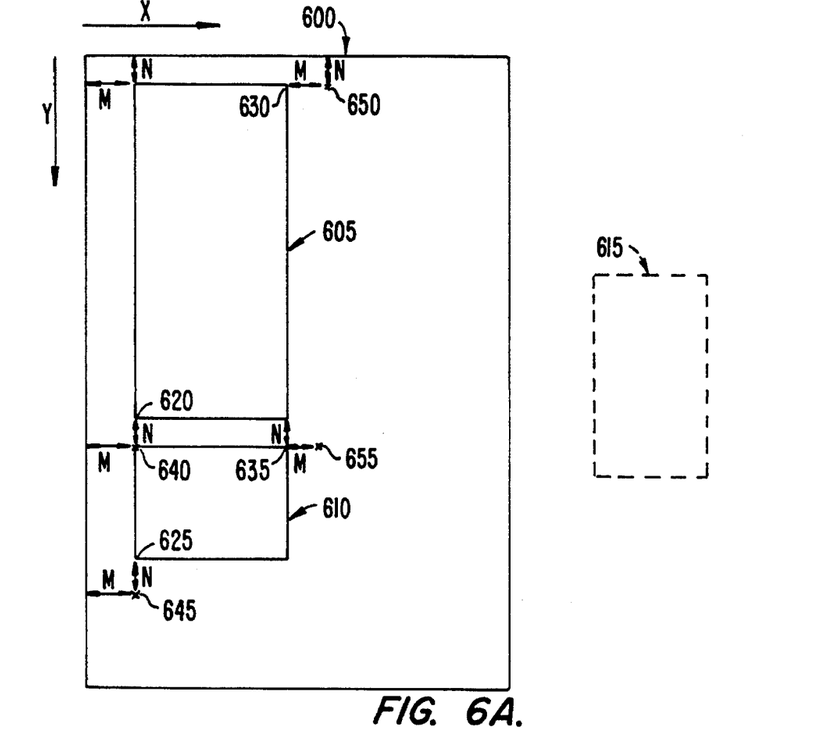
FIG. 6a shows the position of possible anchor points in relation to previously placed object areas as calculated by the system of FIG. 1.

FIG. 6a shows the position of possible anchor points in relation to previously placed object areas. FIG. 6a shows document layout page 600 on which object areas 605 and 610 have already been placed and upon which object area 615 will be placed. From each previously placed object area 605 and 610, two possible anchor points are created: one being offset from the bottom left corners, 620 and 625, of the previously placed object areas and one being offset from the top right corners, 630 and 635, of the previously placed object areas.

The offset of each anchor point is M units on the horizontal plane or X-axis and N units on the vertical plane or Y-axis. One embodiment of the present invention uses values of M and N to be equivalent to ¼ inch each. Of course, other embodiments can use different values for M or N.

The two possible anchor points created from the placement of object area 605 are points 640 and 650. While the two possible anchor points from object area 610 are 645 and 655. One embodiment of the present invention calculates possible anchor points from every previously placed object areas regardless of its position in the document layout. Other embodiments may use only the most recent previously placed object areas or the object areas previously placed on the current page to calculate possible anchor points from.

Referring back to FIG. 5, after all the possible anchor points are calculated, one anchor point is retrieved in step 515 so that various tests can be performed to determine if the anchor point represents a feasible placement of the object area, and thus, should be added to the valid anchor point list. Step 520 checks whether the use of the current possible anchor point to position the current object area would result in the current object area spanning the lower boundary of a page in the document layout. If it would, the split area flag is set in step 525.

Figure 6B:
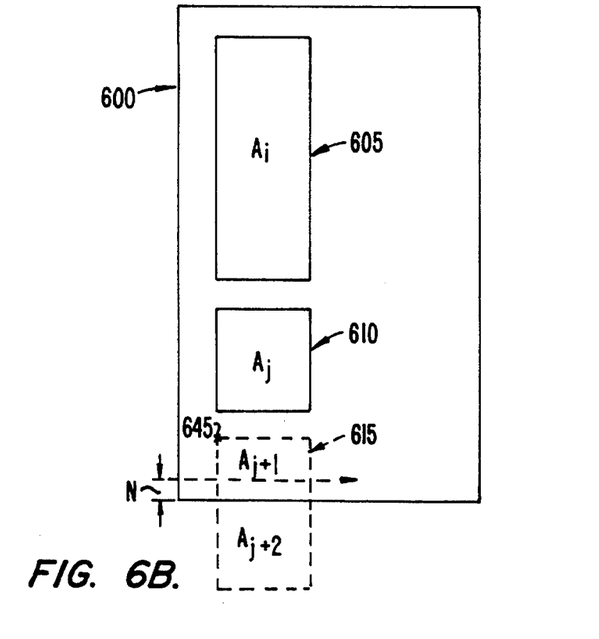
FIG. 6b shows how an object area is split by the system of FIG. 1 into two object areas when its placement spans a page boundary.

FIG. 6b shows how an object area is split into two object areas by the system of FIG. 1 when its placement spans a page boundary. In FIG. 6b, object areas 605 (A(i)) and 610 (A(j)) are already situated on page 600 while object area 615 is being placed at anchor point 645. However, as can be seen from FIG. 6b, the placement of object area 615 at anchor point 645 results in object area 615 spanning the lower boundary of page 600.

In this situation, step 525 sets the split area flag for object area 615, while step 420 will actually split object area 615 N units from the lower page boundary. Splitting object area 615 into two object areas results in the creation of object area (A(j+1)), which is placed at anchor point 645 when step 430 is performed, and object area (A(j+2)), which is added to the front of the list of object areas when step 425 is performed.

Referring back to FIG. 5, step 530 performs a geometric test on the current anchor point to determine if the placement of the current object area at that anchor point would result in the object area overlapping a previously placed object area or spanning a side boundary of a document layout page. FIG. 6a shows an example of a possible anchor point that does not pass the geometric test. When object area 615 is the current object area (the object area being placed), point 640 will have been calculated by step 510 as a possible anchor point. However, it is easy to see that placement of object area 615 at point 640 would result in object area 615 overlapping already placed object area 610. Thus, possible anchor point 640 fails the geometric test of step 530 and is rejected as an actual anchor point for object area 615.

If it is determined that the object area would not violate the geometric test, a second test is performed in step 535. Otherwise, the current possible anchor point is discarded and step 545 checks to see if there are more anchor points to test.

Step 535 performs a logical test referred to as the Reading Order Predicate (ROP) test. The ROP test is used to ensure that a proper reading order is kept throughout the entire document. The reading order is assumed to be in a top to bottom, left to right manner for the English language. However, other embodiments of the present invention can include other reading orders to accommodate different languages.

Table 1 contains pseudocode that is used for the ROP test of the preferred embodiment. It should be noted that many different ROPs can be used in other embodiments of the present invention.

TABLE 1

TP(i) = target page number of area A(i)
TP(j) = target page number of area A(j)
SX(i) = starting X coordinate of area A(i)
SY(i) = starting Y coordinate of area A(i)
EX(i) = ending X coordinate of area A(i)
For each area to be mapped, area A(j), where i<j:

TABLE 1-continued

Figure 7A:
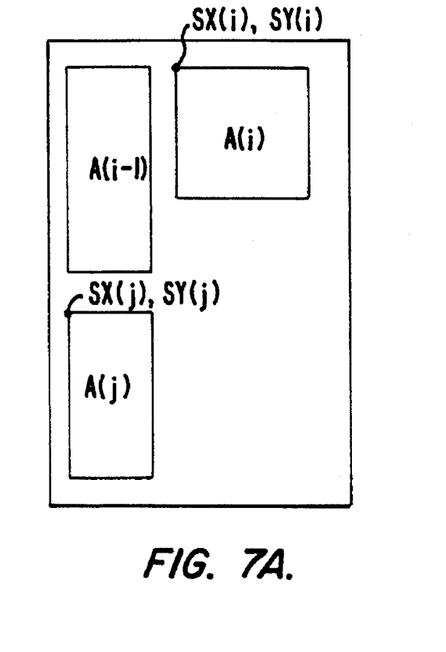
FIGS. 7a and 7b are diagrams showing placements of object areas that violate the rule of placement used by the system of FIG. 1.

If TP(i) = TP(j) THEN
    IF (SX(j) < SX(i)) THEN
        FAIL {reading order violated}
    ELSE IF (SY(j) < SY(i)) AND (SX(j) < (EX(i))
        FAIL {reading order violated}
    ELSE TRUE {reading order is valid}
    END
ELSE IF TP(j) < TP(i) THEN
    FAIL {reading order violated}
ELSE TRUE {reading order is valid}
END ROP test returns a value of TRUE if the assigned reading order has not been violated by a particular placement of the current area. If the reading order has been violated, a value of FALSE is returned. Thus, the current ROP test returns a value of FALSE when area i and area j are located on the same target page and the starting X coordinate of area j is less than the starting X coordinate of any previous area i. FIG. 7a shows an example of a violation of this rule of the ROP test. In FIG. 7a, the reading order of object areas is as follows: area i-1, area i, and area j. As can be seen from the FIG. 7a, the placement of area j violates the ROP procedure test because the starting X coordinate of area j, SX(j), is less than the starting X coordinate of area i, SX(i). If this placement of object areas were allowed, a reader of the English language would naturally read the text from area i-1, then the text from area j, and finally the text from area i. This is an incorrect reading order and is properly eliminated.

Figure 7B:
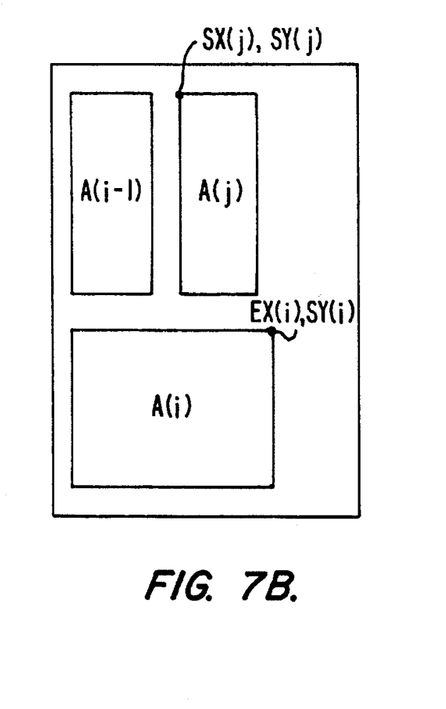

Additionally, the ROP test will return a value of FALSE if area i and area j are located on the same target page, the starting Y coordinate of area j is less than the starting Y coordinate of area i and the starting X coordinate of area j is less than the ending X coordinate of area i. FIG. 7b shows an example of a violation of this rule of the ROP test. Once again, the correct reading order in FIG. 7b is as follows: area i-1, area i, and area j. As can be seen from the FIG. 7b, the placement of area i violates the ROP procedure test because the starting Y coordinate of area j, SX(j), is less than the starting Y coordinate of Area i, SY(i), and the starting X coordinate of area j, SX(j), is less than the ending X coordinate of area i, EX(i). If this placement of object areas were allowed, a reader of the English language would be confused after reading area i-1 as to whether area i or area j is to be read next. Thus, this is an incorrect reading order and is properly eliminated.

Referring back to FIG. 5, a value of FALSE returned from the ROP test performed in step 535 will result in step 545 being executed next and checking whether there are any more possible anchor points. If the ROP test returns a value of TRUE, step 540 adds the current anchor point to the actual anchor point list and step 545 checks whether there are any possible anchor points remaining. If there are more anchor points to check, the system returns to step 515; otherwise, the anchor point list for the current object area is complete.

Step 550 then checks whether the completed anchor point list contains any anchor points. If at least one anchor point is in the list, the system has completed step 405 and moves on to step 407. If step 550 determines that the list of anchor points is empty, which indicates that there are no more anchor points at which to position the current object area and that the current page of the document layout does not have sufficient room to fit the current area to be mapped in, a new page must be added to the layout. Step 555 adds the new page in the manner described below.

Tiling program 112 maps all object areas to a single target buffer. This target buffer can be thought of as a single image that is logically divided into multiple partitions corresponding to output pages. The pages in the target buffer do not correspond directly to the pages in the input or source document, and additional pages are added to the target buffer by increasing the lower boundary of the buffer. Tiling program 112 uses pages of fixed length and fixed width, but other embodiments of the tiling program can be implemented using pages of varying length or varying width.

Figure 8:
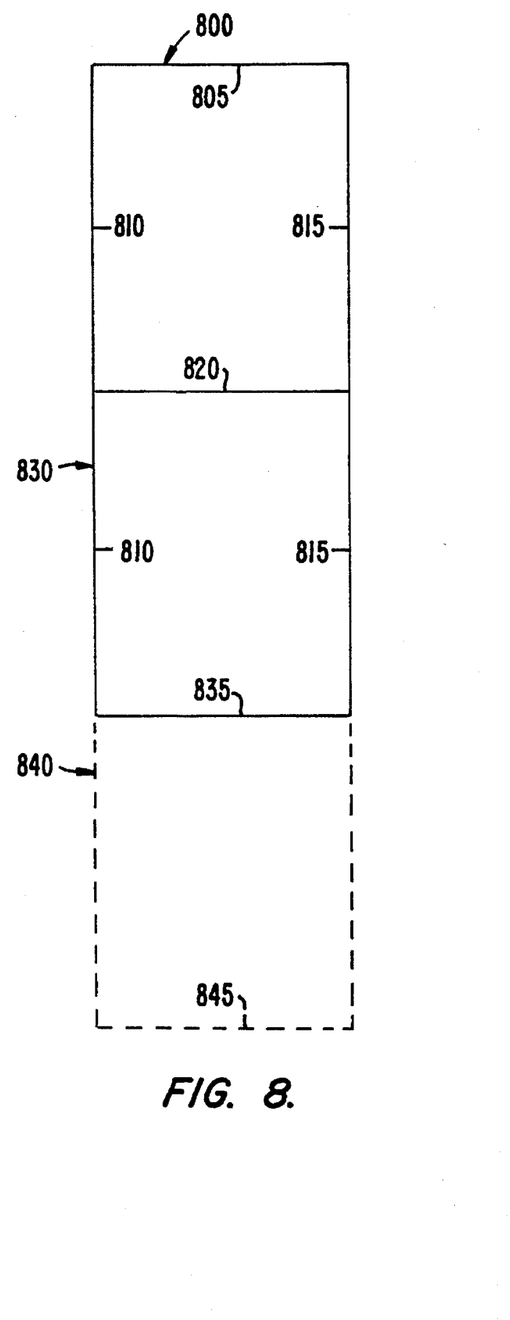
FIG. 8 shows how the system of FIG. 1 divides a single target buffer into multiple target pages and how additional pages are added to the target buffer as necessary.

FIG. 8 shows how the system of FIG. 1 divides a single target buffer into multiple target pages and how additional pages are added to the target buffer as necessary. In FIG. 8, page 800 is the first page of the target buffer. Page 800 has an upper boundary 805, a left boundary 810, a right boundary 815, and a lower boundary 820. Page 830 is the page following page 800 (the second page in the target buffer). Page 830 has left and right boundaries 810 and 815 equivalent to the left and right boundaries of page 800 and has an upper boundary 820 that is equivalent to lower boundary 820 of page 800. Page 830 also has a lower boundary 835.

In FIG. 8, page 840 is to be added to the target buffer. To add page 840, the lower boundary of the target buffer is increased by the known page length. Like all pages, page 840 is defined by its coordinates. Lower boundary 845 of page 840 is found by multiplying its page number by the page length, while upper boundary 835 is one page length smaller than lower boundary 845 and is equal to lower page boundary 835 of page 830.

Referring back to FIG. 5, after step 555 creates a new document layout page, step 560 adds the top left corner of that page to the list of anchor points for the current object area. Then step 405 is completed and the system can perform step 407.

Figure 9:
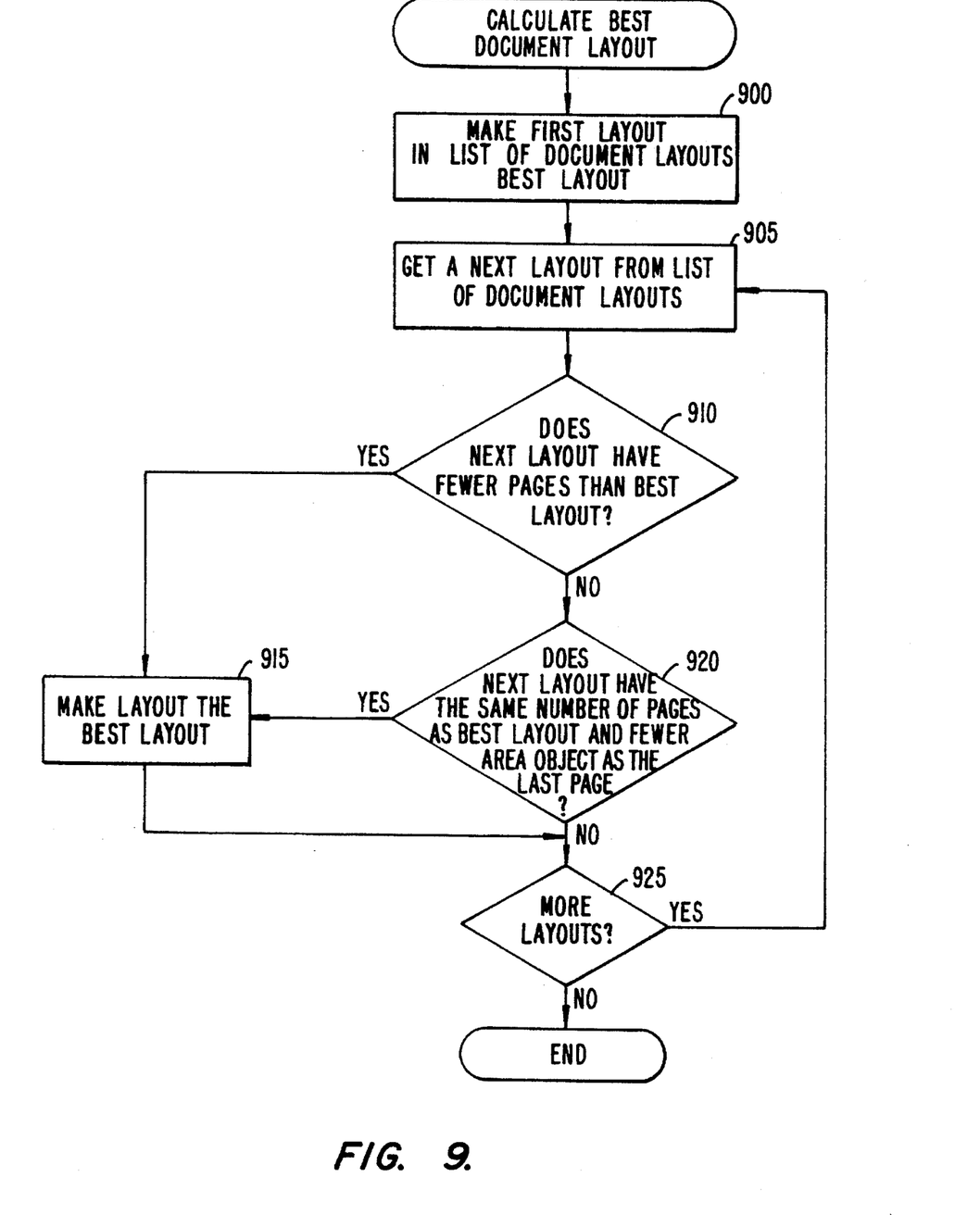
FIG. 9 is a flowchart of the process used by the system of FIG. 1 to select a best document layout from a list of document layouts.

FIG. 9 is a flowchart of the process used to select a best document layout in step 310 from a list of document layouts. In step 900, the first layout list from the list of document layouts is made to be the best document layout. The next layout list from the list of document layouts is then retrieved in step 905. Step 910, compares the number of pages in the next layout list with the number of pages in the best layout list. If the next layout list has fewer pages, step 915 makes the next layout list the new best layout list, and step 925 checks if there are more layouts lists in the list of document layouts.

If step 910 determines that the next layout list does not have fewer pages than the best layout list, step 920 checks if the next layout list has the same number of pages with fewer object areas placed on the last page as the best layout list. If so, step 915 makes the next layout list the new best layout list, and step 925 checks if there are more layout lists in the list of document layouts.

If step 925 determines there are more layout lists, step 905 is invoked again. Otherwise, the best document layout has been found and will be used to create the final document.

Having fully described one embodiment of the present invention and several alternatives to that embodiment, many other equivalent or alternative methods of implementing the document layout creation process will be apparent to those skilled in the art. For example, in choosing a best document layout, layouts can examined, in a manner similar the one set forth in FIG. 9, at various points during their creation to determine if they are superior to layouts that are already created. If a partially complete layout is already inferior, it can be discarded before it is completed, thus saving computer processing time.

Embodiments of the present invention can also be implemented using image segmentation programs that create reading orders different than the reading order used for the English language. Additionally, other embodiments of the present invention can use an image segmentation program that does not order object areas at all. This embodiment could allow a user to select the order object areas are to be placed in a document layout.

Instead of using pointers, other embodiments of the present invention can use arrays or a similar data structures to represent lists of data such as the lists of primitive objects in an object area or the list of mapped object areas in a layout list. Additionally, to conserve memory space, the image data stored with primitive objects can be broken down into any form of binary data that can be reconstructed to represent the original electronic image of the primitive object area.

It is also possible to combine the teaching of the present invention with the teaching of U.S. Patent application "Method and Apparatus for Expansion of White Space in Document Images on a Digital Scanning Device" Ser. No. 08/028,676 filed on Mar. 9, 1993, now abandoned, to produce document layouts that expand the amount of white space that appears between each line. These equivalents and alternatives are intended to be included within the scope of the present invention.

What is claimed is:

1. A method of creating a document layout using a computer processing system comprising the steps of:

(a) receiving an ordered list of object areas, each of said object areas comprising at least one X,Y coordinate pair, data representing an electronic image of a document portion, and a type indicator representing whether said object area corresponds to a picture area or a text area;

(b) creating a plurality of document layouts by recursion, where each invocation of said recursion produces a document layout, each document layout including all of said object areas in said ordered list positioned in a document, by successively placing each of said object areas in said document, according to its order in said list, at one of a set of possible locations for said object area, each location being determined by a rule of placement, said recursion continuing until each of said object areas has been placed at every one of said possible locations in said set; and (c) selecting, according to a criteria, a particular document layout from said plurality of document layouts.

2. The method of creating a document layout of claim 1 further comprising the step of creating and outputting a formatted document using said particular document layout.

3. The method of creating a document layout of claim 2 further comprising the steps of:

(d) scanning and digitizing a document to create computer understandable data corresponding to an image of said document;

(e) forming said object areas from said computer understandable data; and (f) creating an ordered list of said object areas by sorting said formed object areas according to a reading order criteria.

4. The method of creating a document layout according to claim 2 wherein step (b) comprises the steps of:

(1) positioning a first object area in said ordered list at an anchor point near the upper left corner of the document layout;

(2) generating a list of all possible anchor points for a next object area according to said rule of placement;

(3) positioning said next object area at one of said determined anchor points;

(4) repeating steps (2) and (3) recursively for each subsequent object area until all of said object areas have been positioned to create a document layout; and (5) repeating steps (3) and (4) to create a plurality of document layouts until there are no more possible anchor points at which to position any of said object areas.

5. The method of creating a document layout according to claim 2 wherein step (b) comprises the steps of:

(1) fetching a current object area from said ordered list of object areas;

(2) creating a list of actual anchor points for said current object area according to said rule of placement;

(3) fetching a current anchor point from said list of actual anchor points;

(4) making a copy of a list of mapped object areas;

(5) adding said current object area to said list of mapped object areas;

(6) repeating steps (1) through (5) recursively for each subsequent object area until all of said object areas in said ordered list of object areas have been added to said list of mapped object areas creating a document layout; and (7) repeating steps (3) through (6) to create a plurality of lists of mapped object areas corresponding to a plurality of document layouts until there are no more actual anchor points at which to position any of said object areas.

6. The method of creating a document layout of claim 4 or 5 wherein step (2) comprises the steps of:

i) calculating a list of potential anchor points for said current object area;

ii) fetching a current potential anchor point from said list of potential anchor points;

iii) setting a split area flag for said current object area if said current object area represents a text area and said current object area crosses a lower page boundary when positioned at said current potential anchor point;

iv) testing if said current potential anchor point is an actual anchor point according to said rule of placement, and if so, adding said current potential anchor point to said list of actual anchor points; and v) repeating steps (ii) through (iv) for each potential anchor point from said list of potential anchor points;

and, when said current object area's split area flag is set, further comprising the steps of:

vi) splitting said current object area into a first divided object area fitting within said lower page boundary and a second divided object area; and vii) adding said second divided object to said ordered list of object areas.

7. The method of creating a document layout according to claim 6 further comprising the step of adding a new page to said document layout and adding an actual anchor point near the upper left corner of said new page to said list of actual anchor points when said list of actual anchor points created by steps (i) through (iv) is empty.

8. The method of creating a document layout according to claim 6 wherein potential anchor points in said list of potential anchor points are found by using a bottom left corner and a top right corner of each previously placed object area as reference points.

9. The method of creating a document layout according to claim 6 wherein potential anchor points in said list of potential anchor points are found by using as reference points a bottom left corner and a top right corner of each object area previously placed on the same page on which as said current object area is to be placed.

10. The method of creating a document layout of claim 2 wherein:

when said type indicator indicates a text area, said data comprises a list of,primitive text objects, each primitive text object comprising X,Y coordinates representing the position of said primitive text object in said text area, a length, a width, and image data of said primitive text object; and when said type indicator indicates a picture area, said data comprises image data of said picture area.

11. The method of creating a document layout of claim 2 wherein said rule of placement comprises:

(a) a geometric test that determines if said next object area overlaps a previously placed object area and if said next object area crosses a side boundary of a document page; and (b) a reading order predicate test that ensures that said object areas are placed in a proper order.

12. The method of creating a document layout of claim 11 wherein said reading order predicate test fails if:

(a) a starting X-coordinate of said next object area is less than a starting X-coordinate of a previously placed object area; or (b) a starting Y-coordinate of said next object area is less than a starting Y-coordinate of said previously placed object area, and a starting X-coordinate of said next object area is less than an ending X-coordinate of said previously placed object area.

13. A method of reproducing a document using a computer processing system comprising the steps of:

(a) scanning and digitizing a document to create computer understandable binary data corresponding to an image of said document;

(b) creating a list of primitive objects from said binary data, said primitive objects being data structures representing a rectangular portion of said digitized document containing an image of a letter, a group of letters, or a picture;

(c) building a list of rectangular text areas and picture areas, said text areas being formed by grouping primitive objects from said list of primitive objects that contain letters and groups of letters together and said picture areas being formed from said primitive objects in said list of primitive objects that contain picture images;

(d) creating an ordered list of object areas by assigning reading order numbers to said text and picture areas according to a first criterion and ordering said list by said reading order numbers;

(e) creating a plurality of document layouts by recursion, where each invocation of said recursion produces a document layout, each document layout including all of said object areas in said ordered list positioned in a document, by successively placing each of said object areas in said document, according to said order numbers, at one of a set of possible locations for said object area, each location being determined by a rule of placement, said recursion continuing until each of said object areas has been placed at every one of said possible locations in said set;

(f) selecting, according to a second criterion, a particular document layout from said plurality of document layouts; and (g) creating and outputting a formatted document using said particular document layout.

14. The method of creating a document layout according to claim 13 wherein step (e) comprises the steps of:

(1) fetching a current object area from said ordered list of object areas;

(2) creating a list of actual anchor points for said current object area according to said rule of placement;

(3) fetching a current anchor point from said list of actual anchor points;

(4) making a copy of a list of mapped object areas;

(5) adding said current object area to said list of mapped object areas;

(6) repeating steps (1) through (5) recursively for each subsequent object area until all of said object areas in said ordered list of object areas have been added to said list of mapped object areas creating a document layout; and (7) repeating steps (3) through (6) to create a plurality of lists of mapped object areas corresponding to a plurality of document layouts until there are no more actual anchor points at which to position any of said object areas.

15. The method of creating a document layout of claim 14 wherein step (2) comprises the steps of:

i) calculating a list of potential anchor points for said current object area;

ii) fetching a current potential anchor point from said list of potential anchor points;

iii) determining if said current object area crosses a lower page boundary when positioned at said current potential anchor point and if said current object area represents text data, and if so, setting a split area flag for said current object area;

iv) testing if said current potential anchor point is an actual anchor point according to said rule of placement, and if so, adding said current potential anchor point to said list of actual anchor points; and v) repeating steps (ii) through (iv) for each potential anchor point from said list of potential anchor points;

and further comprising the step of splitting said current object area into a first divided object area that fits within said lower page boundary and a second divided object area when said current object area's split area flag is set and adding said second divided object to said ordered list of object areas.

16. The method of creating a document layout according to claim 15 further comprising the step of adding a new page to said document layout and adding an actual anchor point near the upper left corner of said new page to said list of actual anchor points when said list of actual anchor points created by steps (i) through (iv) is empty.

17. A method of creating a document layout using a computer processing system comprising the steps of:

(a) scanning and digitizing a document to create computer understandable binary data corresponding to an image of said document;

(b) creating a list of primitive objects from said binary data, said primitive objects being data structures representing a rectangular portion of said digitized document containing an image of a letter, a group of letters, or a picture;

(c) building a list of rectangular text areas and picture areas, said text areas being formed by grouping primitive objects from said list of primitive objects that contain letters and groups of letters together and said picture areas being formed from said primitive objects in said list of primitive objects that contain picture images;

(d) creating an ordered list of object areas by allowing a user to assign reading order numbers to said text and picture areas in said list;

(e) creating a plurality of document layouts by recursion, where each invocation of said recursion produces a document layout, each document layout including all of said object areas in said ordered list positioned in a document, by successively placing each of said object areas in said document, according to said order numbers, at one of a set of possible locations for said object area, each location being determined by a rule of placement, said recursion continuing until each of said object areas has been placed at every one of said possible locations in said set; and (f) selecting, according to a criterion, a particular document layout from said plurality of document layouts.

18. The method of creating a document layout of claim 17 further comprising the step of creating and outputting a formatted document using said particular document layout.

19. A method of creating a document layout using a computer processing system comprising the steps of:

(a) scanning and digitizing a document to create computer understandable binary data corresponding to the image of said document;

(b) creating a list of primitive objects from said binary data, said primitive objects being data structures representing a rectangular portion of said digitized document containing an image of a letter, a group of letters, or a picture;

(c) building a list of rectangular text areas and picture areas, said text areas being formed by grouping primitive objects from said list of primitive objects that contain letters and groups of letters together and said picture areas being formed from said primitive objects in said list of primitive objects that contain picture images;

(d) creating an ordered list of object areas by assigning reading order numbers to said text and picture areas according to a first criterion and ordering said list by said reading order numbers;

(e) allowing a user to delete object areas from said ordered list of object areas so that said deleted object areas will not be present in the created document layout;

(f) creating a plurality of document layouts by recursion, where each invocation of said recursion produces a document layout, each document layout including all of said object areas in said ordered list positioned in a document, by successively placing each of said object areas in said document, according to said order numbers, at one of a set of possible locations for said object area, each location being determined by a rule of placement, said recursion continuing until each of said object areas has been placed at every one of said possible locations in said set; and (g) selecting, according to a second criterion, a particular document layout from said plurality of document layouts.

20. The method of creating a document layout of claim 19 further comprising the step of creating and outputting a formatted document using said particular document layout.

21. A method of creating a document layout comprising the steps of:
- (a) receiving an ordered list of object areas, each of said object areas comprising at least one X,Y coordinate pair, data representing an electronic image of a document portion, and a type indicator representing whether said object area corresponds to a picture area or a text area;
- (b) creating a plurality of partially completed document layouts by recursion, where each invocation of said recursion produces a partially completed document layout, each partially completed document layout including a subset of said object areas in said ordered list positioned in a document, by successively placing each of said object areas in said document, according to its order in said ordered list, at one of a set of possible locations for said object area, each location being determined by a rule of placement, said recursion continuing until each of said object areas has been placed at every one of said possible locations in said set;
- (c) selecting, according to a first criteria, at least one particular partially completed document layout from said plurality of partially completed document layouts;
- (d) creating at least one completed document layout from said selected partially completed document layouts, said completed document layout including all of said object areas in said ordered list positioned in said document, by successively placing each of said object areas not in said subset of object areas into said partially completed document, according to its order in said ordered list, at every location at which said object area can be positioned according to said rule of placement; and
- (e) selecting, according to a second criterion, a particular completed document layout.

22. The method of creating a document layout of claim 21 further comprising the step of creating and outputting a formatted document using said particular document layout.

23. An apparatus for creating a document layout, said apparatus comprising:
- (a) a scanner for scanning and digitizing a document; and
- (b) a computer system comprising a memory and processing means, coupled to said memory, said processing means comprising:
  - i) means for creating a list of primitive objects from said digitized document, said primitive objects being data structures representing a rectangular portion of said digitized document containing the image of a letter, a group of letters, or a picture;
  - ii) means for creating a list of text areas and picture areas, said text areas being formed by grouping primitive objects from said list of primitive objects that contain letters and groups of letters together and said picture areas being formed from said primitive objects in said list of primitive objects that contain a picture;
  - iii) means for creating an ordered list of object areas by assigning reading order numbers to said text and picture areas according to a first criterion and ordering said list by said reading order numbers;
  - iv) means for creating a plurality of document layouts by recursion, where each invocation of said recursion produces a document layout including all of said object areas in said ordered list, or a specified subset thereof, positioned in a document; and
  - v) means for selecting, according to a criterion, a particular document layout from said plurality of document layouts.

24. The apparatus of claim 23 further comprising output means for outputting a document image of said particular document layout onto a visual medium.

25. The apparatus of claim 24 wherein said output means comprises a printer and said visual medium comprises paper.

* * * * *